United States Patent [19]
Koizumi et al.

[11] Patent Number: 5,288,450
[45] Date of Patent: Feb. 22, 1994

[54] PROCESS FOR PRODUCING MOLDED ARTICLE OF CONTINUOUS LENGTH

[75] Inventors: Junji Koizumi; Haruyasu Mizutani; Koichi Ogiso; Atsushi Goto, all of Aichi, Japan

[73] Assignee: Toyoda Gosei Co., Ltd., Inazawa, Japan

[21] Appl. No.: 840,895

[22] Filed: Feb. 26, 1992

[30] Foreign Application Priority Data

Feb. 27, 1991 [JP] Japan .................. 3-55900

[51] Int. Cl.$^5$ .................. B29C 71/02; B29C 45/72
[52] U.S. Cl. .................. 264/235; 264/237; 264/297.2; 264/328.14; 264/346; 264/348; 425/445
[58] Field of Search .................. 264/235, 237, 346, 348, 264/178 R, 297.2, 342 R, 328.14; 425/445

[56] References Cited

U.S. PATENT DOCUMENTS

| | | |
|---|---|---|
| 2,372,630 | 3/1945 | Smith .................. 264/235 |
| 3,068,525 | 12/1962 | Linton, Jr. et al. .................. 264/342 R |
| 3,383,375 | 5/1968 | van der Vegt et al. .................. 264/346 |
| 3,504,080 | 3/1970 | Siggel et al. .................. 264/235 |
| 4,025,594 | 5/1977 | Agrawal .................. 264/235 |
| 4,077,098 | 3/1978 | Ayusawa et al. .................. 425/445 |
| 4,110,062 | 8/1978 | Summers .................. 264/178 R |
| 4,120,926 | 10/1978 | Titz .................. 264/348 |
| 4,450,133 | 5/1984 | Cafarelli .................. 264/348 |
| 4,777,001 | 10/1988 | Kobayashi et al. .................. 264/177.16 |
| 4,911,873 | 3/1990 | Kuzuya et al. .................. 264/148 |

FOREIGN PATENT DOCUMENTS

| | | | |
|---|---|---|---|
| 60-18334 | 1/1985 | Japan .................. | 264/346 |
| 61-211021 | 9/1986 | Japan .................. | 264/346 |
| 1581170 | 12/1980 | United Kingdom .................. | 264/235 |

OTHER PUBLICATIONS

Co-pending U.S. Application No. 07/826,612.

*Primary Examiner*—Jeffery Thurlow
*Attorney, Agent, or Firm*—Cushman, Darby & Cushman

[57] ABSTRACT

A process for dimensionally stabilizing an article molded from a synthetic resin material, such as PVC. The molded article is subjected to a first cooling treatment to cool the article at a temperature lower than the glass transition temperature Tg of the synthetic resin followed by a heating treatment at a temperature higher than the glass transition temperature Tg and then is subjected to a second cooling treatment again at a temperature lower than the glass transition temperature Tg. Following such treatment steps, the molded article, such as side molding for automobiles, have less variation in dimensions and less shrinkage after molding in use.

12 Claims, 3 Drawing Sheets

PROCESS FOR PRODUCING MOLDED ARTICLE OF CONTINUOUS LENGTH

BACKGROUND OF THE INVENTION

1. Field of the Invention

The present invention relates to a process for producing a molded article and in particular to a process for producing molded articles formed of a synthetic resin which have less dimensional variation following manufacturing and less shrinkage after molding during use.

2. Background Information

Synthetic resin materials, such as, for example, polyvinyl chloride (PVC), are frequently used for molding elongated articles, such as side moldings, for use on automobiles.

Such elongated articles formed of a synthetic resin material are often produced by injection molding techniques and then annealed (heat treated) as will be described hereafter. The finished products are then mounted upon automobiles.

However, many such elongated molded articles experience so-called shrinkage in use. Accordingly, the spacing provided between adjacent automobile moldings, or between the molding and the edge of an automobile body, may be undesirably widened during use on automobiles. In some instances shrinkage will reduce the length of elongated moldings to a length that is so short that they do not meet a given minimum size prior to mounting upon an automobile or perhaps are so changed in their dimensions that they become impossible to mount upon the automobile.

Consequently, appearance qualities are lowered and obstacles develop in the desired mounting of moldings. Therefore, requirements for higher dimensional accuracy of elongated products molded from synthetic resin materials has recently become more severe.

Synthetic resin materials such as PVC and rubber-containing polypropylene generally have a shrinkage factor of 10/1000 to 20/1000. In usual molding processes, the synthetic materials do not reach an equilibrium shrinkage in the mold. The molded article is removed from the mold while it only partially shrunk. Accordingly, shrinkage occurs after molding so that the article is shortened in dimension and there exists increased dimensional variation among products.

On the other hand, annealing treatments of products performed prior to shipping from the factory or after users get them, has generally been known as an approach to suppress shrinkage after molding. The term "annealing treatment" includes techniques of heating molded articles at, for example, 40° to 100° for 10 to 150 minutes and then to gradually cool it.

This annealing treatment can suppress shrinkage after molding, but has little effect in suppressing other dimensional variations among products. Therefore, such annealing treatments are not suitable for elongated molded articles for which dimensional accuracy is required.

The present invention overcomes the above mentioned problems.

It is an object of the present invention to provide a process for producing molded products which have less dimensional variation and less shrinkage after molding in use.

SUMMARY OF THE INVENTION

In order to accomplish the aforementioned objects, the present invention provides a process for producing a molded article including the steps of molding such articles from a synthetic resin material. The molded articles are then subjected to a first-cooling treatment for cooling the articles to a temperature lower than the glass transition temperature Tg of the synthetic resin material being used for molding purposes. Then the articles are subjected to a heating treatment at a temperature higher than the glass transition temperature Tg followed subsequently by subjecting the articles to a second cooling treatment again at a temperature lower than the glass transition temperature Tg.

A significant feature of the present invention resides in treating a molded article, immediately after molding, to the first cooling treatment, the heating treatment and the second cooling treatment in order to adjust the dimensional stability of the molded article. It is also a feature of the present invention that the temperature of each treatment is preset based upon the glass transition temperature Tg of the synthetic resin material which forms the molded article.

The term "immediately after molding" is meant to include the time following when the molded article has been removed from the mold and more specifically within one minute after the removal of the molded article from a mold.

As noted above, the molded article is cooled at a temperature lower than the glass transition temperature Tg of the material forming the molded article in the first cooling treatment immediately after the removal of the article from the mold. It is preferable that the treatment temperature be less than the glass transition temperature Tg, by 15° C. or more, that is, not be higher than a temperature [Tg-15]°C. The higher the cooling temperature of the first cooling treatment, the less its effect. It is preferable that the period of time of the first cooling treatment, or dwell time for the molded article in the cooling treatment range from about 30 seconds to about 10 minutes although, in view of economical efficiency, it may be desirably preset depending upon the thickness of the product.

Subsequently, the heating treatment is carried out at a temperature which is higher than the glass transition temperature Tg. The temperature is preferably higher than the glass transition temperature Tg by 20° C. or more, that is, not less than [Tg+20]°C. The lower the temperature of the heating treatment step, the less its effect. It is preferable that the period of time for the heating treatment can range from about 30 seconds to about 10 minutes, although, in view of economical efficiency, it can be desirably preset depending upon the thickness of the product.

The second cooling treatment is carried at a temperature lower than the glass transition temperature Tg. It is preferable that the temperature of the second cooling fall within a rang which is lower than the glass transition temperature Tg by 10° C. to 40° C., that is, within a range [Tg-40]°C. to [Tg-10]°C. The temperature not less than [Tg-10]°C. is excessively high while the temperature not higher than [Tg-40]°C. is excessively low in view of economical efficiency.

It is preferable that the period of time of the second cooling treatment range between about 30 seconds to about 10 minutes although it can be desirably preset depending upon the thickness of the product.

Although each treatment can be performed by blowing cold or hot air, it is preferable that the treatment be performed in cooled or heated water in view of production and heat treatment efficiency. The product is allowed to stand after the second cooling treatment. Also, it can be noted that the first cooling treatment, the heating treatment and the second cooling treatment are, preferably, carried out successively.

The synthetic resin material which may be used in the present invention is not specifically limited. It may include polyvinyl chloride, polypropylene, polyamide, polyester and polyurethane. The term "elongated molded article" used herein preferably includes a molded article which is not less than 30 cm in length, although the process of the present invention will dimensionally stabilize any shaped molded article.

In accordance with the present invention, the molded article which has just been molded is subjected to a dimension adjusting treatment upon the basis of the glass transition temperature Tg in order of the first cooling treatment, the heating treatment and the second cooling treatment as mentioned above.

Hence, the present invention results in molded articles having less variation in dimensions among like products and less dimensional change due to shrinkage after molding. Therefore, it is not necessary to perform additional production steps on the finished molded article of continuous length to adjust the dimensions thereof, resulting in a reduction of manufacturing costs. The appearance quality of such articles will also be enhanced.

The precise reasons why the present invention effects a reduction of dimensional variation and shrinkage after molding effects is not clear. However, the reasons can be inferred as follows: the molecular motion in the molded article immediately after the molding is, in effect, temporarily frozen to suppress the shrinkage of the article by the first cooling treatment. This causes the variation in dimensions among a number of such articles to be remarkably reduced. The molded article is then heated which relaxes the molding distortion which took place during molding.

The molecules are packed in the highest density by the second cooling treatment, undertaken subsequent to the heating treatment, so that an annealing effect, due to a synergistic effect with the heating treatment, is obtained. Thereafter, allowing the articles to remain in a room temperature atmosphere provides stabilization of the highest density packing of the molecules and the adjustment of the linear expansion coefficient. In such a manner, the above mentioned effect can be obtained.

The present invention, therefore, presents an improved process for producing molded articles having less dimensional variation among many molded articles and lesser shrinkage after molding.

Other objects, features, and characteristics of the present invention, as well as the methods and operation and functions of the related elements of the structure, and the combination of parts and economies of manufacture, will become apparent upon consideration of the following description and the appended claims with reference to the accompanying drawings, all of which form a part of this specification, wherein like reference numerals designate corresponding parts in the various figures.

DETAILED DESCRIPTION OF THE INVENTION

The process for producing an elongated molded article in accordance with the present invention will first be generally described with reference to FIGS. 1 through 4.

Figure 1:
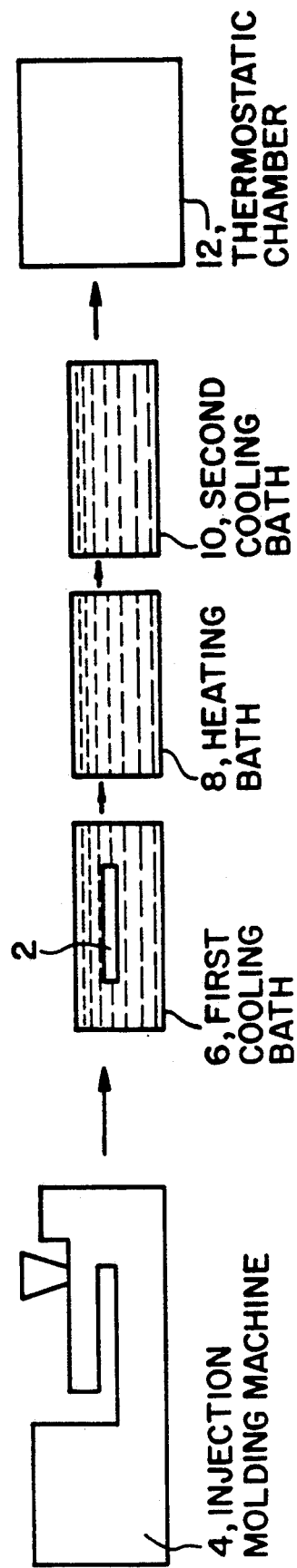
FIG. 1 is a diagrammatic sketch of the process steps according to the present invention.
Figure 2:
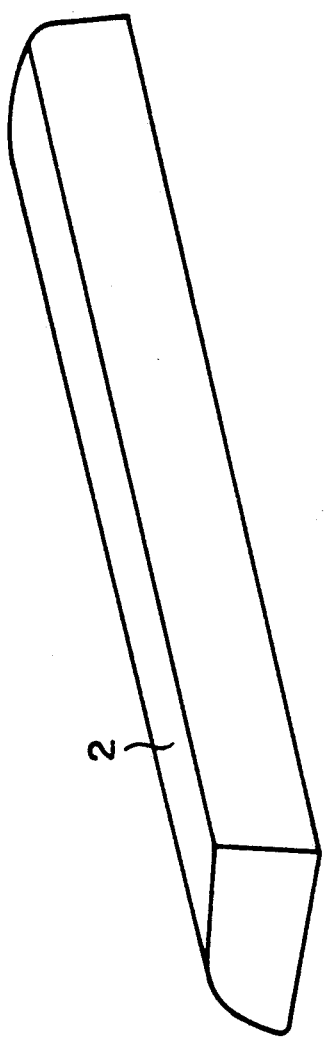
FIG. 2 is a perspective view of a molded article.

With reference first to FIGS. 1 and 2, an elongated molded article 2 is formed using conventional molded techniques from a synthetic resin material in an injection molding machine 4. Immediately after molding, the molding article 2 is subjected to a first cooling treatment in a cooling bath 6. This first cooling bath is the first step in adjusting the dimensions of the molded article. After a predetermined dwell time, the molded article 2 is then removed from the first cooling treatment, bath 6, and immersed in a heating bath 8 where it is subjected to a heating treatment. Following reheating, the article is then subjected to a second cooling treatment in a second cooling bath 10. Thereafter, the molded article 2 is put into a thermostatic chamber 12 which is maintained at a desired room temperature and is allowed to stand therein for a predetermined period of time.

The first cooling bath is preferably comprised of cold water having a temperature lower than the glass transition temperature of the synthetic resin material from which the molded article is formed. The first cooling treatment is carried out by immersing the molded article 2 into the cold water. The heating bath is preferably comprised of hot water having a temperature higher than the glass transition temperature of the synthetic resin material used for molding this article. The heating treatment is also carried out by immersing the molded article 2 into the hot water. The second cooling bath is preferably comprised of cold water which again has a temperature lower than the glass transition temperature of the synthetic resin material from which the molded article is formed. The second cooling treatment is also carried out by immersing the article 2 in the cold water.

EXAMPLE 1

Elongated side trim moldings for use with automobiles were injection molded and following removal from the molding apparatus were subjected to a dimension adjustment treatment in accordance with the present invention. Experiments on the shrinkage after molding of the molded articles of continuous length in use thereof were conducted by annealing and reannealing the molded articles of continuous length.

Table 1 below sets forth that for molding purposes two different synthetic resin materials A and B having two different compositions, mainly including polyvinyl chloride resin, were used. In Table 1, PVC and DOP denote polyvinyl chloride (polymerization degree of 700) and dioctyl phthalate used as a plasticizer, respectively.

TABLE 1

| MATERIAL COMPOSITIONS | | | |
|---|---|---|---|
| SYNTHETIC RESIN MATERIAL | | MATERIAL A | MATERIAL B |
| PVC | PART | 100 | 100 |
| DOP | BY | 30 | 50 |
| CALCIUM CARBONATE | WEIGHT | 12.5 | 20 |
| STABILIZER | | 3 | 3 |
| PIGMENT | | 2 | 2 |
| GLASS TRANSITION TEMPERATURE T g | | 40° C. | 27° C. |

The above mentioned synthetic resin material was injected into a suitable mold to form elongated side molding having a full length of 300 mm. About 10 seconds after the molded article was removed from the mold, the article was subjected to size adjusting treatment in accordance with the present invention.

Molded articles which had been subjected to such size adjusting treatment, that is initial products, were subjected to an annealing treatment for 5 hours, then cooled to room temperature and then subjected to another annealing treatment under the same conditions in order to measure the amount of shrinkage after molding in use and dimensional variations among the initial products. The term "initial product" refers to a product prior to shipping from the factory or a product when users begin to use it.

Changes in the dimensions of the molded articles, having lengths of about 1300 mm, formed by injection molding, were measured before and after the dimension adjusting treatment (that is, the initial product), the annealing and reannealing treatment. The results are set forth below in Tables 2 and 3.

TABLE 2

| | SAMPLE NO. | MATERIAL | DIMENSION ADJUSTING TREATMENT | DIMENSION MEDIAN (x) INITIAL PRODUCTS | VARIATION ($\sigma$) 60° C. × 5 Hr AFTER ANNEALING | SHRINKAGE (y) 60° C. × 5 Hr AFTER ANNEALING | ANNEALING SHRINKAGE $\Delta y_1 = y_2 - y_1$ $\Delta y_2 = y_3 - y_1$ |
|---|---|---|---|---|---|---|---|
| COMPARATIVE EXAMPLE | C1 | A | INJECTION MOLDING ↓ 15° C. COLD WATER 2 MIN. | $x_1 = 1289.0$ $\sigma_1 = 0.37$ $y_1 = 21.0$ | $x_2 = 1283.2$ $\sigma_2 = 0.80$ $y_2 = 26.2$ | $x_3 = 1280.8$ $\sigma_3 = 29.2$ $y_3 = 29.2$ | $\Delta y_1 = 5.2$ $\Delta y_2 = 8.2$ |
| | C2 | A | INJECTION MOLDING ↓ 15° C. COLD WATER 2 MIN. ↓ 80° C. HOT WATER 2 MIN. | $x_1 = 1282.5$ $\sigma_1 = 0.55$ $y_1 = 27.5$ | $x_2 = 1280.2$ $\sigma_2 = 0.73$ $y_2 = 29.8$ | $x_3 = 1279.8$ $\sigma_3 = 0.76$ $y_3 = 30.2$ | $\Delta y_1 = 2.3$ $\Delta y_2 = 2.7$ |
| PRESENT INVENTION | 1 | A | INJECTION MOLDING ↓ 15° C. COLD WATER 2 MIN. ↓ 80° C. HOT WATER 2 MIN. ↓ 15° C. COLD WATER 2 MIN ↓ 20° C. IN AIR 15 MIN | $x_1 = 1281.2$ $\sigma_1 = 0.23$ $y_1 = 28.8$ | $x_2 = 1279.9$ $\sigma_2 = 0.28$ $y_2 = 30.1$ | $x_3 = 1279.3$ $\sigma_3 = 0.29$ $y_3 = 30.7$ | $\Delta y_1 = 1.3$ $\Delta y_2 = 1.9$ |

TABLE 3

| | SAMPLE NO. | MATERIAL | DIMENSION ADJUSTING TREATMENT | DIMENSION MEDIAN (x) INITIAL PRODUCTS | VARIATION ($\sigma$) 60° C. × 5 Hr AFTER ANNEALING | SHRINKAGE (y) 60° C. × 5 Hr AFTER ANNEALING | ANNEALING SHRINKAGE $\Delta y_1 = y_2 - y_1$ $\Delta y_2 = y_3 - y_1$ |
|---|---|---|---|---|---|---|---|
| PRESENT INVENTION | 2 | A | INJECTION MOLDING ↓ 10° C. COLD WATER 2 MIN. ↓ 60° C. HOT WATER 3 MIN. ↓ 10° C. COLD WATER 2 MIN. ↓ 20° C. IN AIR 15 MIN | $x_1 = 1283.2$ $\sigma_1 = 0.21$ $y_1 = 26.8$ | $x_2 = 1280.5$ $\sigma_2 = 0.29$ $y_2 = 29.5$ | $x_3 = 1279.7$ $\sigma_3 = 0.30$ $y_3 = 30.3$ | $\Delta y_3 = 2.7$ $\Delta y_2 = 3.5$ |
| | 3 | B | INJECTION MOLDING ↓ 10° C. COLD WATER 2 MIN. ↓ 60° C. HOT WATER 2 MIN. ↓ 10° C. COLD WATER 2 MIN ↓ | $x_1 = 1279.5$ $\sigma_1 = 0.32$ $y_1 = 30.5$ | $x_2 = 1277.9$ $\sigma_2 = 0.38$ $y_2 = 32.1$ | $x_3 = 1277.0$ $\sigma_3 = 0.40$ $y_3 = 33.0$ | $\Delta y_1 = 1.6$ $\Delta y_2 = 2.5$ |

TABLE 3-continued

| | | | MEASUREMENT RESULTS | | | |
|---|---|---|---|---|---|---|
| SAMPLE NO. | MATERIAL | DIMENSION ADJUSTING TREATMENT | DIMENSION MEDIAN (x) INITIAL PRODUCTS | VARIATION ($\sigma$) 60° C. × 5 Hr AFTER ANNEALING | SHRINKAGE (y) 60° C. × 5 Hr AFTER ANNEALING | ANNEALING SHRINKAGE $\Delta y_1 = y_2 - y_1$ $\Delta y_2 = y_3 - y_1$ |
| | | 20° C. IN AIR 15 MIN | | | | |

Measurement of sample Nos. 1 through 3 under dimension adjustment conditions and comparative sample Nos. C1 and C2 are shown in the Tables.

Dimensional median X in Tables 2 and 3 denotes an average value of the full length of the initial product after the dimension adjusting treatment and the molded product after annealing and reannealing. Measuring was conducted for 10 molded articles. The average values are shown in Tables 2 and 3.

Dimension variation $\sigma$ denotes the dimensional variation of the full length of the molded articles on each measurement. It should be noted that the smaller the dimensional variation $\sigma$ the better the molded product.

Shrinkage amount y denotes the difference between the dimensions of the mold and the molded article. Annealing shrinkage $\Delta y_1$, denotes the value calculated by subtracting of the initial article $y_1$ from the $y_2$ annealing value. Annealing shrinkage $\Delta y_2$ denotes the value which is $y_3$ on reannealing minus $y_1$ of the initial article. The lower the value $\Delta y_1$ and $\Delta y_2$, the better the molded article. The measurements after the annealing and reannealing were measured 3 hours after the articles were allowed to cool from each annealing.

Specifically describing the experiments, sample No. 1 of the present invention, as on Table 2, was subjected to the first cooling treatment in cold water held at 15° C. for 2 minutes after completion of the injection molding process. Sample No. 1 was thereafter subjected to a heating treatment in hot water maintained at 80° C. for 2 minutes and then subjected to the second cooling treatment in cold water at 15° C. for 2 minutes. After the dimension adjusting treatment, sample No. 1 was allowed to stand in air maintained at 20° C. for 15 minutes. The dimensions of the initial article were measured and then subjected to the annealing and reannealing. The dimensions at each time were measured. Samples 2, 3, C1, C2 were also subjected to the dimension adjusting treatment under the conditions set forth in Tables 2 and 3.

The temperature at which the first cooling treatment for the Sample 1 of the present invention was conducted was 15° C., which is 25° C. lower than the 40° C. glass transition temperature Tg for the plastic material used for molding Sample 1. The heating treatment temperature was carried out at 80° C. which was 40° C. higher than the 40° C. glass transition temperature Tg. The second cooling treatment temperature was also undertaken at 15° C. which was again 25° C. lower than the glass transition temperature Tg.

Sample 2 was also formed of synthetic resin material A. The first and second cooling treatment temperatures for Sample 2 were 30° C. lower than the glass transition temperature Tg for material A while the heating treatment temperature was 20° C. higher than the glass transition temperature Tg for material A.

Sample 3 was formed of synthetic resin material B. The first and second cooling temperatures used with Sample 3 were 17° C. lower than the glass transition temperature Tg for material B while the heating treatment temperature was 33° C. higher than material B's glass transition temperature Tg.

It is apparent from Tables 2 and 3 that the dimensional variation $\sigma$ for Sample 1 of the present invention is narrow and ranged from 0.23 to 0.29 after the dimension adjustment, annealing and reannealing. Also, the annealing shrinkages $\Delta y_1$ and $\Delta y_2$ are small and varied between 1.3 and 1.9, respectively. Accordingly, the dimensional stability of the molded articles was excellent.

In contrast to this, Sample C1, a comparative example, was cooled in cold water at 15° C. for 2 minutes immediately after molding and exhibited dimensional variations $\sigma$ after dimension adjustment as wide as 0.37 and annealing shrinkages, $\Delta y_1$ and $\Delta y_2$, as large as 5.2 and 8.2, respectively. Sample C1 was formed of the same synthetic resin material A as that of the sample 1 of the present invention.

Sample C2, another comparative example, was also formed of the same synthetic resin material A as was Sample 1. Sample C2 was subjected to a cooling treatment in cold water at 15° C. and then subjected to the second cooling treatment of the present invention. Accordingly, the variation in dimensions after dimension adjustment, annealing and reannealing is wide and the annealing shrinkage was large.

Although Sample 2 of the present invention was formed of the same synthetic resin material A as Sample 1, the temperatures of the first and second cooling treatment and the heating treatment are lower than those used with Sample 1. The dimensional variation $\sigma$ was 0.21 to 0.30 which is substantially equal to that of Sample 1. The annealing shrinkages $\Delta y_1$ and $\Delta y_2$ are 2.7 and 3.5, respectively, of Sample 2, which are slightly larger than the annealing shrinkages $\Delta y_1$ (=2.3) and $\Delta y_2$ (=2.7) of comparative example C2.

Sample 3 was formed of a synthetic resin material which is different in composition from those of the Samples 1, 2, C1 and C2. The dimensional variation $\sigma$ for Sample 3 were narrow, varying from 0.32 to 0.40 after the dimension adjustment, annealing and reannealing and the annealing shrinkage was also small.

Figure 3:
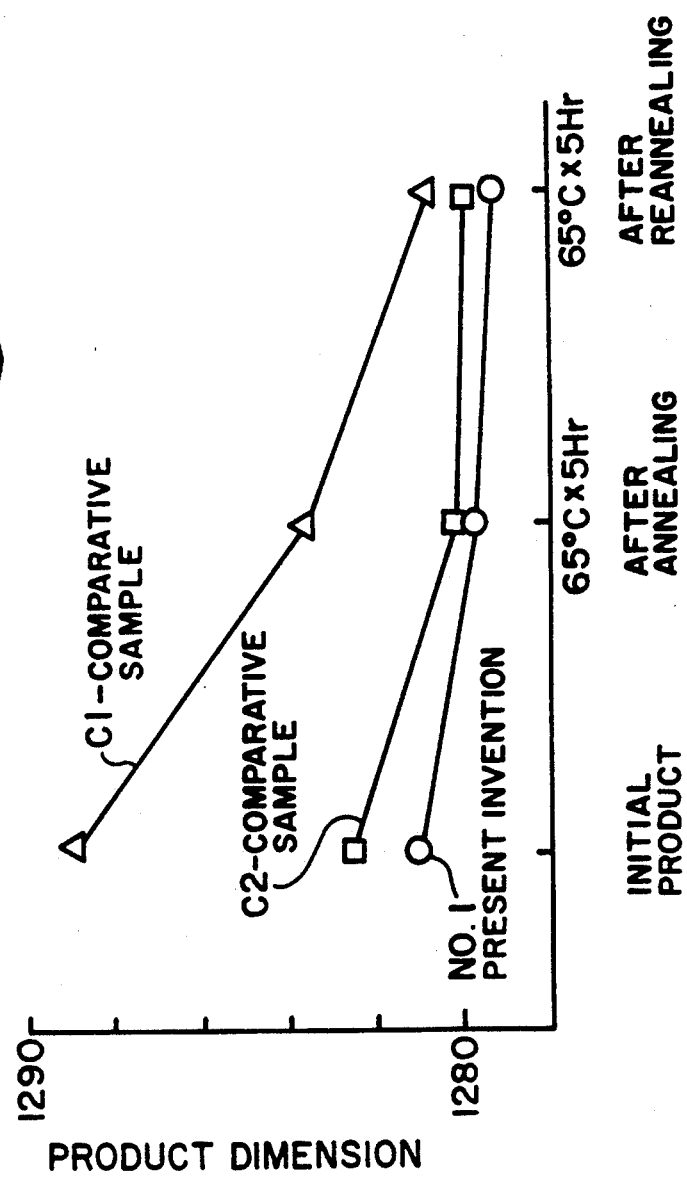
FIG. 3 is a graphical comparison of a sample of the present invention in comparison with other samples.

The dimension changes for Sample 1 of the present invention, and comparative Samples C1 and C2, after the dimension adjustment, annealing and reannealing, are graphically shown in FIG. 3. It is apparent from FIG. 3 that Sample 1 is an excellent molded article since it exhibits very low dimensional changes in comparison with cooperative Samples C1 and C2 which have not been subjected to dimension adjustment of the present invention.

It is to be understood from the foregoing that the molded article treated in accordance with the present invention has less dimensional variation and less shrinkage after molding than molded articles not so treated.

Figure 4:
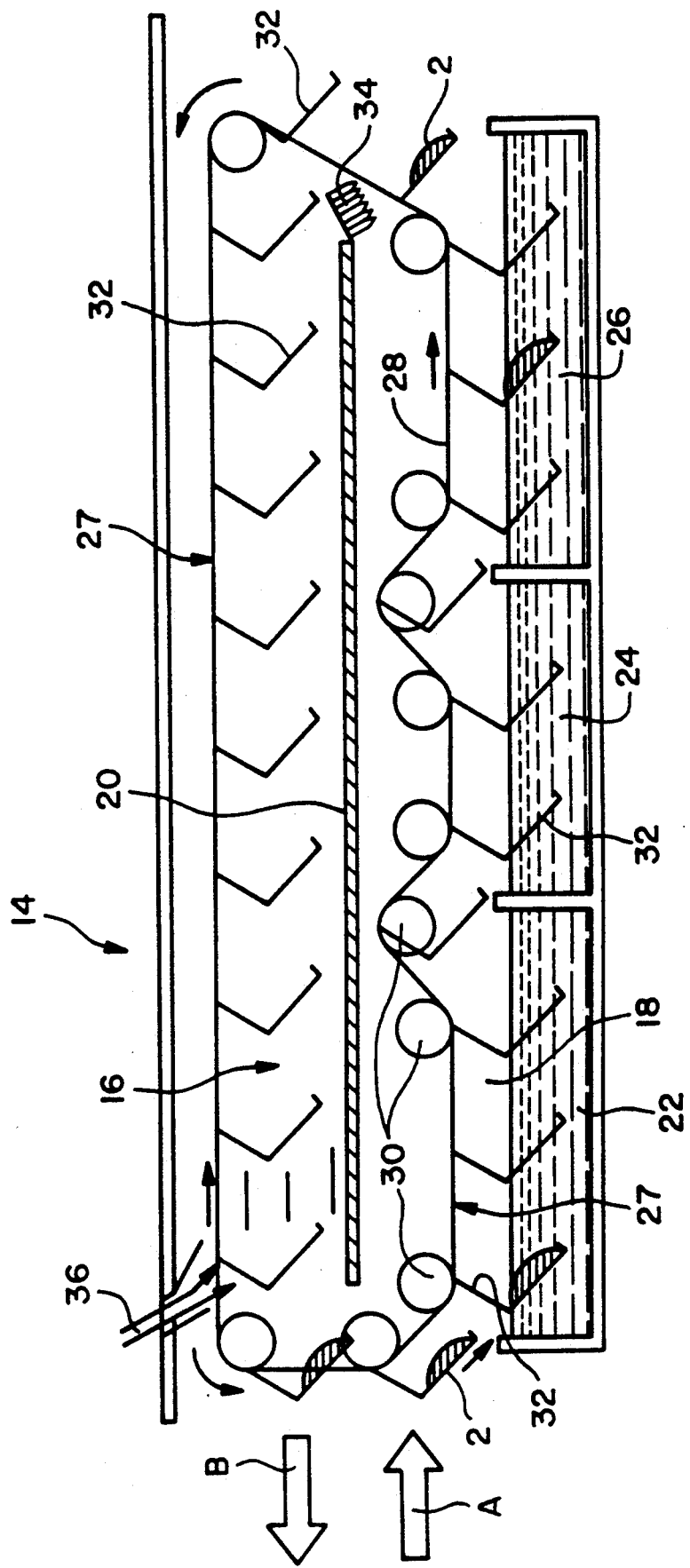
FIG. 4 is a diagrammatic sketch of apparatus for use in performing the steps of the present invention.

Exemplary dimension adjusting treatment apparatus, used in performing the treating process of the present invention is shown in FIG. 4.

The treatment apparatus, generally shown at 14, is a continuous flow device and is partitioned into an upper cold standing chamber 16 and a lower heat treatment chamber 18 by an adiabatic spacing plate 20. The heat treatment chamber 18 is divided into a first cooling bath 22 for performing the first cooling treatment. A heating bath 24 for the heating treatment directly follows cooling bath 22 and a second cooling bath 26 for the second cooling treatment directly follows heat bath 24. A suspension type, continuous conveyor belt system, generally indicated at 27, is moved in an endless manner through the apparatus, and specifically through the heat treatment chamber 18 and the cold standing chamber 16. The conveyor belt system 27 includes a main support belt 28, constructed from conventional conveyor belt material, is supported by rollers 30 and moved in a continuous by a suitable belt drive arrangement (not shown) of a conventional type. Belt 30 supports a plurality of spaced apart hangers 32 on which respective molded articles are placed.

Prior to the dimension adjusting treatment of the molded articles 2, the articles 2 which have been just molded are successively placed upon the hangers 32 as represented by an arrow A in the drawing. The hangers 32 are circulated along an endless path as shown in the drawing. Accordingly, the molded articles 2 are first immersed into cold water of the first cooling bath 22 together with hangers 32 and are subjected to the first cooling treatment. The belt 28 then raised hangers 32 and the molded articles 2 are removed from bath 22 and then immediately immersed in hot water in heating bath 24 where each molded article is heated. Following heating, each article is then removed from bath 24 and then immersed into cold water in the second cooling bath 26 and there subjected to the second cooling treatment.

Any water remaining on the molded articles following their removal from the second cooling bath 26 is blown away by an air jet nozzle 34 and the articles are conveyed to the upper standing chamber 16. Air at about 20° C. is supplied into chamber 16 from a pipe 36 located adjacent the exit end of chamber 16. Plate 20 corrals and channels this air so that it flows down chamber 16 in a counter current flow relative to the movement of conveyor 27. The molded articles 2 exiting chamber 16 are removed from conveyor system 27 and from the treatment apparatus 14 as finished products, as is represented by arrow B in FIG. 4.

The apparatus makes it possible to continuously perform the desired dimension adjusting treatment, used with the samples of the present invention, and enhances the efficiency of the production of the improved molded articles.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A process for producing dimensionally stable injection molded articles from synthetic resins, comprising the steps of:
    injection molding an article of a synthetic resin material having a glass transition temperature Tg;
    removing the article from a mold while maintaining the temperature of the article above Tg;
    subjecting the molded article, immediately after molding, to a first cooling treatment prior to the article reaching Tg and cooling the article to a temperature lower than Tg;
    subjecting the cooled article to a heating treatment and heating the article to a temperature higher than Tg; and
    subsequently subjecting the article to a second cooling treatment and cooling the article to a temperature lower than Tg so that the injection molded articles possess less dimensional and shrinkage variation in use after molding.

2. The process of claim 1 wherein the first cooling treatment is carried out at temperatures at least 15° C. below the glass transition temperature Tg.

3. The process of claim 1 wherein the heating treatment is carried out at temperatures at least 20° C. above the glass transition temperature Tg.

4. The process as in claim 1 wherein the second cooling treatment is carried out at temperatures at least 10° C. below the glass transition temperature Tg.

5. A process as in claim 1 wherein the second cooling treatment is carried out at temperatures ranging from about 10° C. to about 40° C. below the glass transition temperature Tg.

6. A process as in claim 2 wherein the dwell time for first cooling step ranges from about 30 seconds to about ten minutes.

7. A process as in claim 4 wherein the dwell time for the second cooling step ranges from about 30 seconds to about ten minutes.

8. A process as in claim 1 wherein the dwell time for each of the cooling and heating steps ranges from about 30 seconds to about ten minutes.

9. A process as in claim 1 wherein the first cooling treatment is carried out at temperatures at least 15° C. below the glass transition temperature Tg and the second cooling treatment is carried out at temperatures at least 10° C. below the glass transition temperature Tg and the dwell time for each of the cooling and heating steps ranges from about 30 seconds to about ten minutes.

10. A process as in claim 9 wherein the heating treatment is carried out at temperatures at least 20° C. above the glass transition temperature Tg.

11. A process as in claim 1 further including the step of retaining the molded articles at a predetermined room temperature for a predetermined period of time.

12. A process as in claim 11 wherein the temperature is about 20° C. and the time period is about 15 minutes.

* * * * *